(12) United States Patent
Yang et al.

(10) Patent No.: US 8,254,218 B2
(45) Date of Patent: Aug. 28, 2012

(54) RECORDING METHOD AND APPARATUS FOR OPTICAL DISK DRIVE

(75) Inventors: Tzu-Ching Yang, Taoyuan (TW); Chuan-Li Wang, Taipei (TW); Ming-Tsung Huang, Zhubei (TW); Shih-Hao Ko, Hsinchu (TW); Kuo-Jung Lan, Jhonghe (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 12/835,148

(22) Filed: Jul. 13, 2010

(65) Prior Publication Data

US 2010/0278020 A1 Nov. 4, 2010

Related U.S. Application Data

(63) Continuation-in-part of application No. 12/102,529, filed on Apr. 14, 2008, now abandoned, which is a continuation of application No. 11/160,114, filed on Jun. 9, 2005, now Pat. No. 7,382,707, which is a continuation-in-part of application No. 10/711,943, filed on Oct. 14, 2004, now Pat. No. 7,522,493.

(30) Foreign Application Priority Data

Dec. 3, 2003 (TW) ................................ 92134059 A

(51) Int. Cl.
*G11B 7/00* (2006.01)
(52) U.S. Cl. ................ 369/44.11; 369/44.29; 369/47.25; 369/59.15; 369/44.28
(58) Field of Classification Search ................ 369/44.11
See application file for complete search history.

(56) References Cited

U.S. PATENT DOCUMENTS

| 5,363,362 | A | 11/1994 | Maeda et al. | |
| 5,841,747 | A | 11/1998 | Kubota et al. | |
| 5,852,593 | A | 12/1998 | Ishida et al. | |
| 6,317,398 | B1 | 11/2001 | Shimada | |
| 6,704,253 | B2 | 3/2004 | Tanaka | |
| 6,754,150 | B1 | 6/2004 | Usui | |
| 6,930,964 | B2 | 8/2005 | Matsui | |
| 7,016,278 | B2 | 3/2006 | Lee et al. | |
| 7,046,964 | B1* | 5/2006 | Sullivan et al. | 455/67.11 |
| 7,116,607 | B2* | 10/2006 | Lee et al. | 369/30.16 |
| 2001/0003519 | A1 | 6/2001 | Tsukihashi | |
| 2002/0101793 | A1 | 8/2002 | Sakata | |
| 2002/0150004 | A1* | 10/2002 | Kadlec | 369/44.29 |
| 2002/0172106 | A1 | 11/2002 | Kim et al. | |
| 2003/0058753 | A1* | 3/2003 | Lee et al. | 369/30.16 |

(Continued)

FOREIGN PATENT DOCUMENTS

CN 1452171 10/2003

(Continued)

*Primary Examiner* — Van Chow
(74) *Attorney, Agent, or Firm* — Thomas|Kayden

(57) ABSTRACT

A recording apparatus for an optical disk drive is provided. The recording apparatus includes a driver, a servo signal generator, a filter, and a counter. The driver controls a recording speed of the optical disk drive. The servo signal generator generates at least a servo signal. The filter with a specific bandwidth filters the servo signal to generate a filtered servo signal. The counter generate a count value according to the filtered servo signal and instructs the driver to decrease the recording speed of the optical disk drive when the count value exceeds a trigger value, so as to record with the decreased recording speed.

18 Claims, 8 Drawing Sheets

U.S. PATENT DOCUMENTS

| | | |
|---|---|---|
| 2003/0072235 A1 | 4/2003 | Naoi et al. |
| 2003/0123358 A1* | 7/2003 | Kanda et al. ............... 369/53.22 |
| 2003/0151990 A1 | 8/2003 | Hanamoto et al. |
| 2003/0165097 A1* | 9/2003 | Tseng et al. ............... 369/47.33 |
| 2003/0198155 A1 | 10/2003 | Go et al. |
| 2004/0004920 A1 | 1/2004 | Jung et al. |
| 2004/0141432 A1 | 7/2004 | Toda et al. |
| 2004/0141441 A1 | 7/2004 | Nagai et al. |
| 2005/0030858 A1 | 2/2005 | Hung |
| 2005/0041565 A1* | 2/2005 | Hsu et al. ................. 369/124.12 |
| 2005/0099922 A1 | 5/2005 | An |
| 2005/0122869 A1 | 6/2005 | Yamamoto |
| 2005/0128914 A1 | 6/2005 | Yamamoto |
| 2005/0232099 A1 | 10/2005 | Wu et al. |

FOREIGN PATENT DOCUMENTS

| | | |
|---|---|---|
| CN | 1488140 | 4/2004 |
| EP | 1 453 209 | 9/2004 |
| JP | 9288827 | 11/1997 |
| WO | WO 03/085839 | 10/2003 |

* cited by examiner

RECORDING METHOD AND APPARATUS FOR OPTICAL DISK DRIVE

CROSS REFERENCE TO RELATED APPLICATIONS

This application is a Continuation-In-Part of application Ser. No. 12/102,529, filed on Apr. 14, 2008 (now abandoned), which is a Continuation Application of Ser. No. 11/160,114, now U.S. Pat. No. 7,382,707, filed on Jun. 9, 2005, which is a Continuation-In-Part of application Ser. No. 10/711,943 filed on Oct. 14, 2004, now U.S. Pat. No. 7,522,493. application Ser. No. 10/711,943 claims priority for Application 092134059 filed on Dec. 3, 2003 in Taiwan.

BACKGROUND OF THE INVENTION

1. Field of the Invention

The present invention is related to a recording, or so-called burning, method and an apparatus for an optical disk drive, and more particularly to a recording method and an apparatus capable of decreasing the rotation speed for an optical disk drive.

2. Description of the Related Art

The recording speed, e.g., 4x or 8x, of an optical disk drive mainly depends on the type of the optical disk, and optical disks of different types have different time codes. If the quality of the optical disk or optical disk drive is worse intrinsically, the recording efficiency and quality will be affected, especially for mass recording, and thus inferior recording quality will become more obvious.

An inferior servo signal of an optical disk drive, e.g., defocusing, or buffer under-run caused by that the data transmission speed from a host is slower than the recording speed, may give rise to the interruption of recording. After refocusing or complementing the data to the buffer, the recording will be reconnected and resumed. Because the recording speed before and after the interruption is not changed, the interruption and reconnection may occur repeatedly. Such unceasing recording interruption and reconnection seriously affect the recording speed, and even result in the degradation of the recording quality so that the readability of the optical disk will become worse.

U.S Pat. Application. No. 2002/0172106 A1, "Apparatus for and Method of Controlling Writing of Data When Error Occurs in an Optical Drive," reveals a method of dealing with a recording interruption employed after the recording is interrupted. However, the method cannot prevent the occurrence of interruption. In addition, if an optical disk is of inferior quality, the recording quality of the optical disk cannot be improved further.

BRIEF SUMMARY OF THE INVENTION

The objective of the present invention is to provide a recording method and an apparatus for an optical disk drive, which are capable of preventing the recording quality degradation due to the inferior servo signal, and can avoid the decrease of recording efficiency due to the continual recording interruption and reconnection caused by the buffer under-run.

Recording apparatuses and methods thereof for optical disk drives are provided. An exemplary embodiment of a recording apparatus for an optical disk drive comprises a driver, a servo signal generator, a filter, and a counter. The driver controls a recording speed of the optical disk drive. The servo signal generator generates at least a servo signal. The filter with a specific bandwidth filters the servo signal to generate a filtered servo signal. The counter generates a count value according to the filtered servo signal and instructs the driver to decrease the recording speed of the optical disk drive when the count value exceeds a trigger value, so as to record with the decreased recording speed.

Furthermore, an exemplary embodiment of a recording method for an optical disk drive is provided. First, a recording is performed with a recording speed of the optical disk drive controlled by a driver of the optical disk drive. At least a servo signal from a servo signal generator is received. The received servo signal is filtered by a filter with a specific bandwidth. A count value is generated by a counter of the optical disk drive according to the filtered servo signal. When the count value exceeds a trigger value, the recording is ceased and the recording speed of the optical disk drive is decreased. The recording is resumed with the decreased recording speed.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
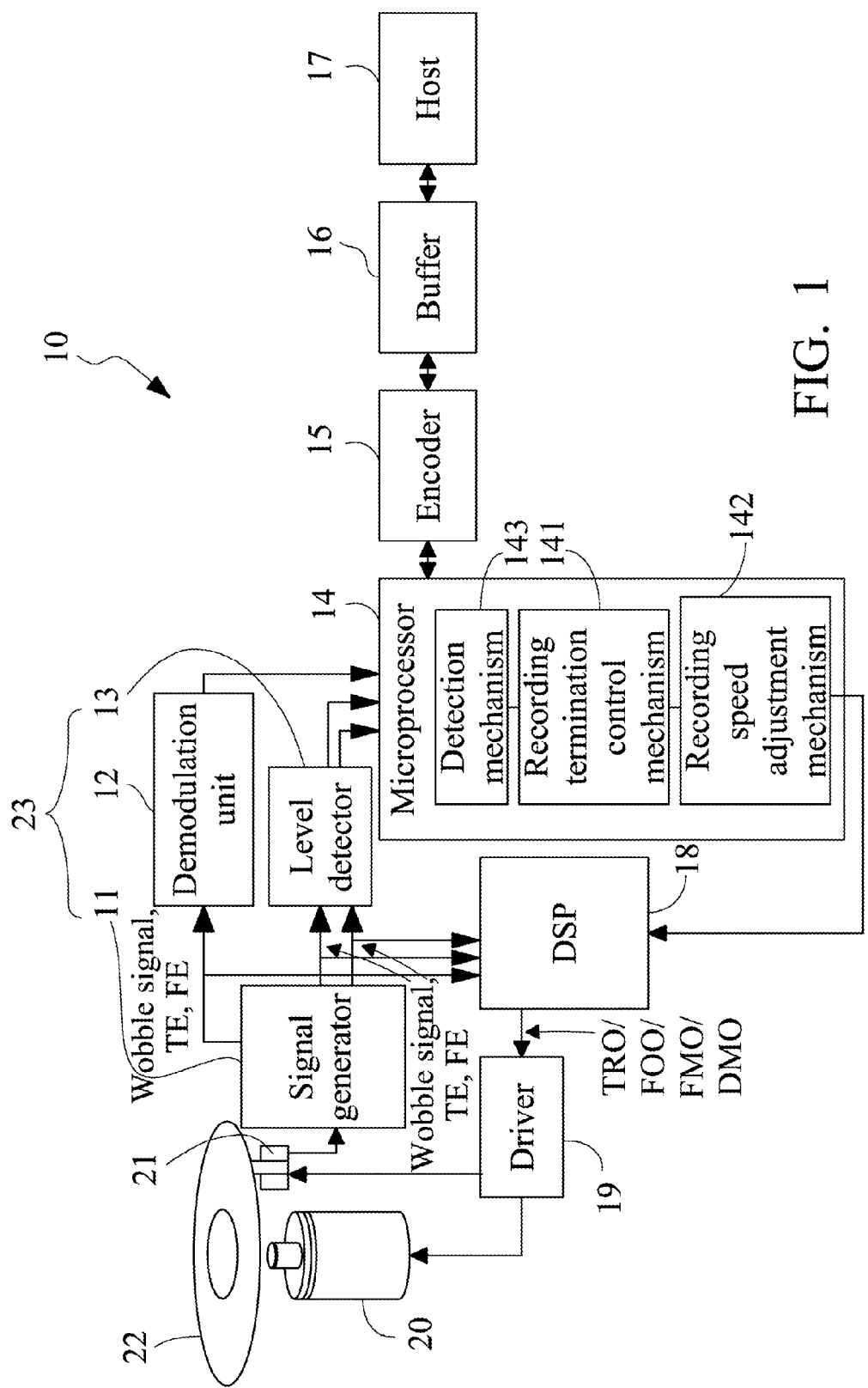
FIG. 1 illustrates a recording apparatus of an optical disk drive in accordance with the present invention.

FIG. 1 is a schematic diagram of an embodiment of the recording apparatus of an optical disk drive in accordance with the present invention. A recording apparatus 10 for an optical disk drive comprises a signal generator 11, a demodulation unit 12, the level detector 13, a microprocessor 14, an encoder 15, a buffer 16, a host 17, a DSP 18 and a driver 19, where the signal generator 11, the demodulation unit 12 and the level detector 13 constitute a servo signal generation unit 23. The signal generator 11 connected to an optical pickup head 21 is used to synthesize the optical signals read from an optical disk 22 by the optical pickup head 21, so as to generate the TE signals required for track locking, the FE signals required for focusing, and the wobble signals required for positioning or controlling the rotation speed. All these servo signals are then sent to the DSP 18 for processing so as to generate driving signals TRO, FOO, FMO and DMO. The driver 19 is able to drive the optical pickup head 21 by the driving signals TRO, FOO and FMO, and drive the motor 20 to rotate the optical disk 22 by the driving signal DMO. Besides being transmitted to the DSP 18 from the signal generator 11, the TE, FE and the wobble signals are also sent to the demodulation unit 12 and the level detector 13, respectively. The demodulation unit 12 is used to demodulate the wobble signal, and if the error rate is too high or the wobble synchronization pattern loss exceeds a preset threshold value, a recording termination control mechanism 141 and a recording speed adjustment mechanism 142 will be activated to interrupt recording and decrease the rotation speed of the motor 20, i.e., the recording speed will be decreased. If the level detector 13 figures out that the levels of the TE and FE signals exceed preset threshold values, the recording termination control mechanism 141 and the recording speed adjustment mechanism 142 will be activated as well. The microprocessor 14 is used to control and execute the recording termination control mechanism 141 and the recording speed adjustment mechanism 142. First, the recording termination control mechanism 141 sends a recording pause command to the encoder 15 and informs the host 17 to stop transferring data to the buffer 16. When the recording termination is confirmed, the microprocessor 14 will set relative parameters for decreasing the rotation speed of the optical disk drive, and transmit the parameters to the DSP 18 for generating the driving signal DMO to lower the rotation speed of the motor 20. Afterwards, the recording termination control mechanism 141 sends a recording connection command to the encoder 15 to implement the sequential recording work and continuously monitor whether the servo signals meet the recording termination criteria. Further, the microprocessor 14 also can implement a detection mechanism 143 to detect the error rate of a demodulated wobble signal and the frequency of the buffer under-run occurrence. If the error rate of the demodulated wobble signal and the frequency of the buffer under-run occurrence exceed the preset threshold values, the recording termination control mechanism 141 and the recording speed adjustment mechanism 142 will also be activated to cease recording and decrease the recording speed.

Figure 2:
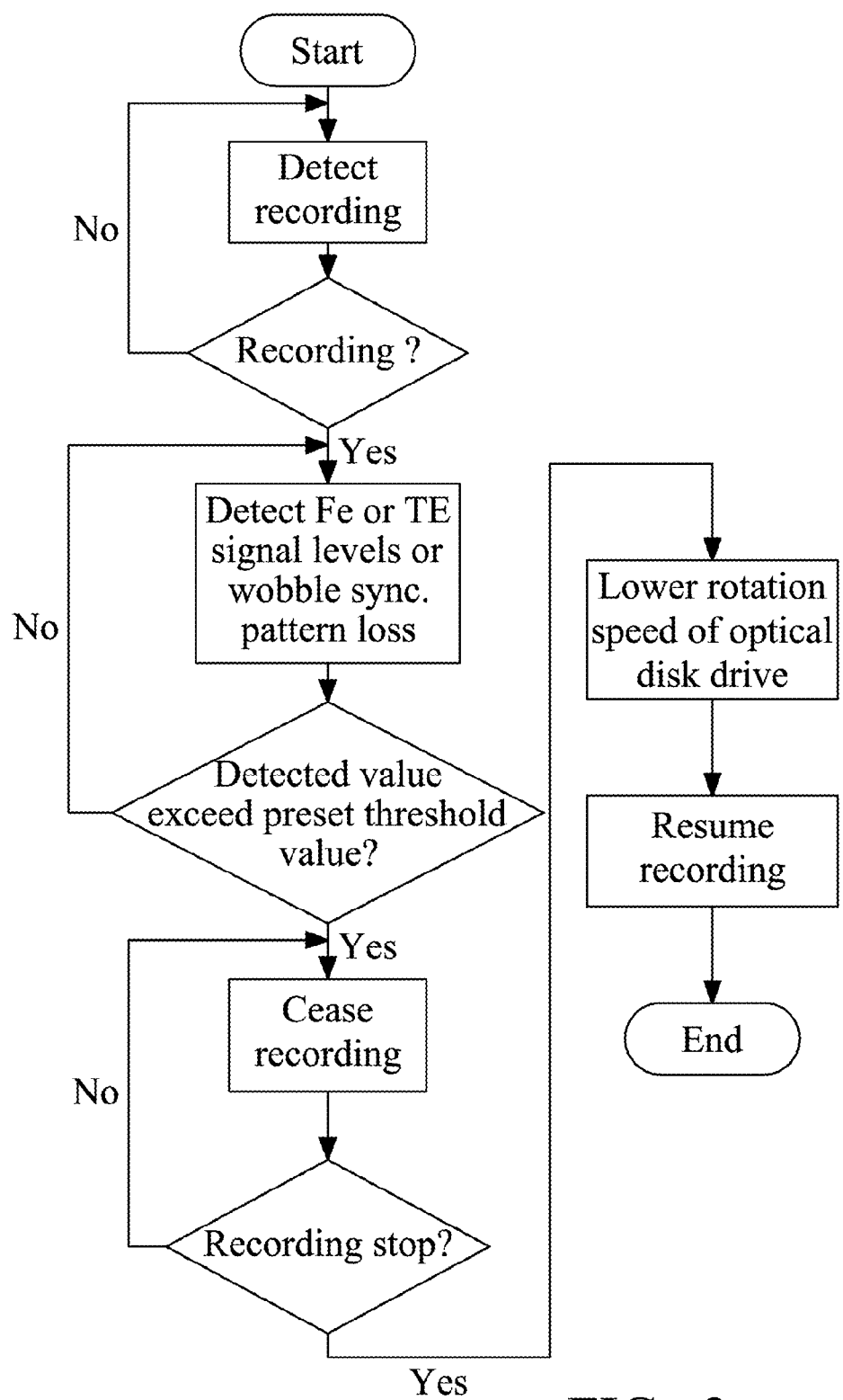
FIG. 2 illustrates a recording flow chart of an optical disk drive of the first embodiment in accordance with the present invention.

The above-described recording process can be concluded as shown in FIG. 2. First, if the recording is underway in the optical disk drive, the detection of servo signals such as the level of the FE or TE signal and the wobble synchronization pattern loss are started. If the detected values of the above-described servo signals exceed the preset thresholds, the recording will be ceased. Subsequently, the rotation speed of the optical disk drive is decreased and the sequential recording work is resumed. The above described recording process can be supplemented with a step of detecting the recording status to ensure whether the optical disk drive is in recording or stop status, so as to avoid the impact of the recording quality and the recording speed due to the error during the implementation of detecting the servo signal or decreasing recording speed.

Figure 3:
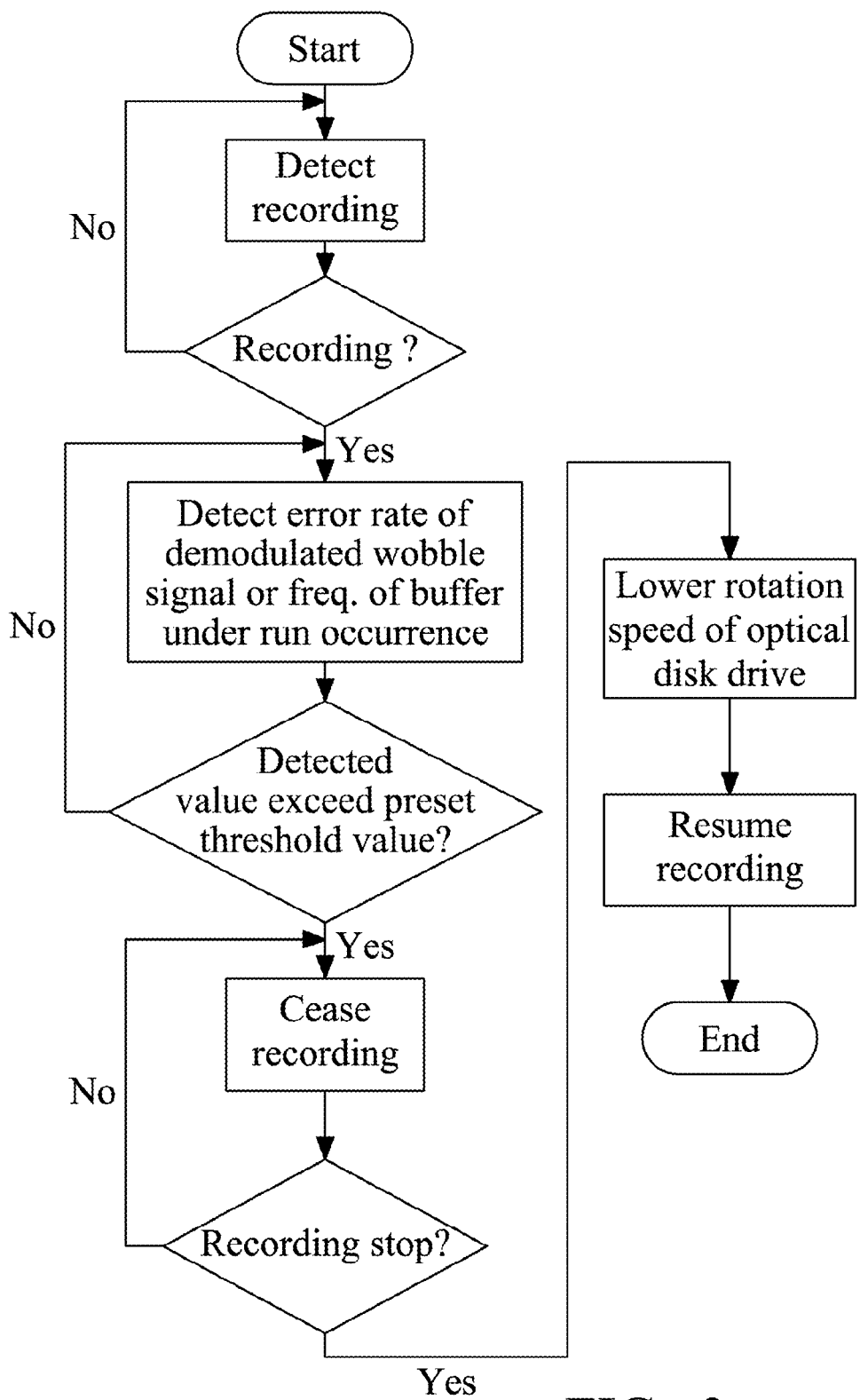
FIG. 3 illustrates a recording flow chart of an optical disk drive of the second embodiment in accordance with the present invention.

Besides taking the above-described servo signals as the basis for decreasing the rotation speed of the optical disk drive, the error rate of demodulating the wobble signal or the number of recording interruption caused by the buffer under-run in a time period, i.e., the frequency of the buffer under-run occurrence, also can be calculated as the basis for activating the recording speed adjustment mechanism. If the error rate of demodulating a wobble signal or the frequency of the buffer under-run occurrence exceeds the preset threshold value, the recording is not resumed until the rotation speed of the optical disk drive is decreased. The above process is shown in FIG. 3.

Moreover, other signals such as the temperature of the drive, the wobble jitter of the wobble signal, or write power can be used as determination indices for decreasing the driver rotation speed as well. These parameters may be monitored and controlled prior to recording, so that the recording quality at the beginning of recording can be further improved.

Figure 4:
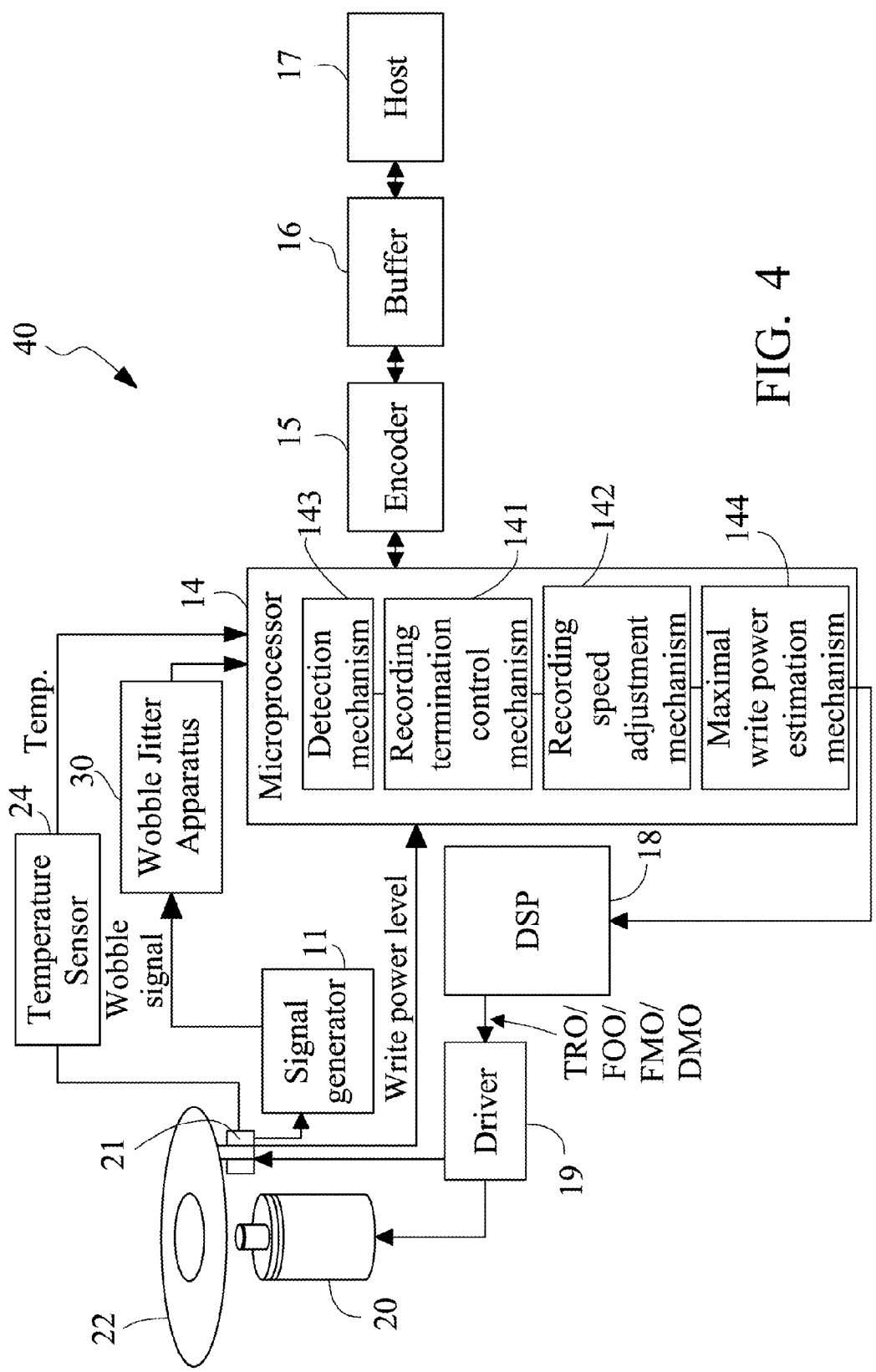
FIG. 4 illustrates another recording apparatus of an optical disk drive in accordance with the present invention.

FIG. 4 illustrates another embodiment of the recording apparatus 40 of an optical disk drive in accordance with the present invention, which is similar to FIG. 1. In comparison with FIG. 1, a wobble jitter apparatus 30 is in place of the demodulation unit 12 for detecting the jitter of the wobble signal, the level detector 13 in FIG. 1 is omitted. The temperature of the drive detected by a temperature sensor 24 and the write power level are transmitted to the microprocessor 14. Consequently, the temperature of the drive, the wobble jitter and the write power are further taken into account for determining the timing to decrease the rotation speed of the driver 19. The wobble jitter apparatus 30 can be omitted if the microprocessor 14 is capable of calculating the jitter of the wobble signal. The microprocessor 14 further comprises a maximal write power estimation mechanism 144 for estimating the maximal value of write power during recording process according to the result of optimal power calibration (OPC), which is intended to control the DSP 18.

Figure 5:
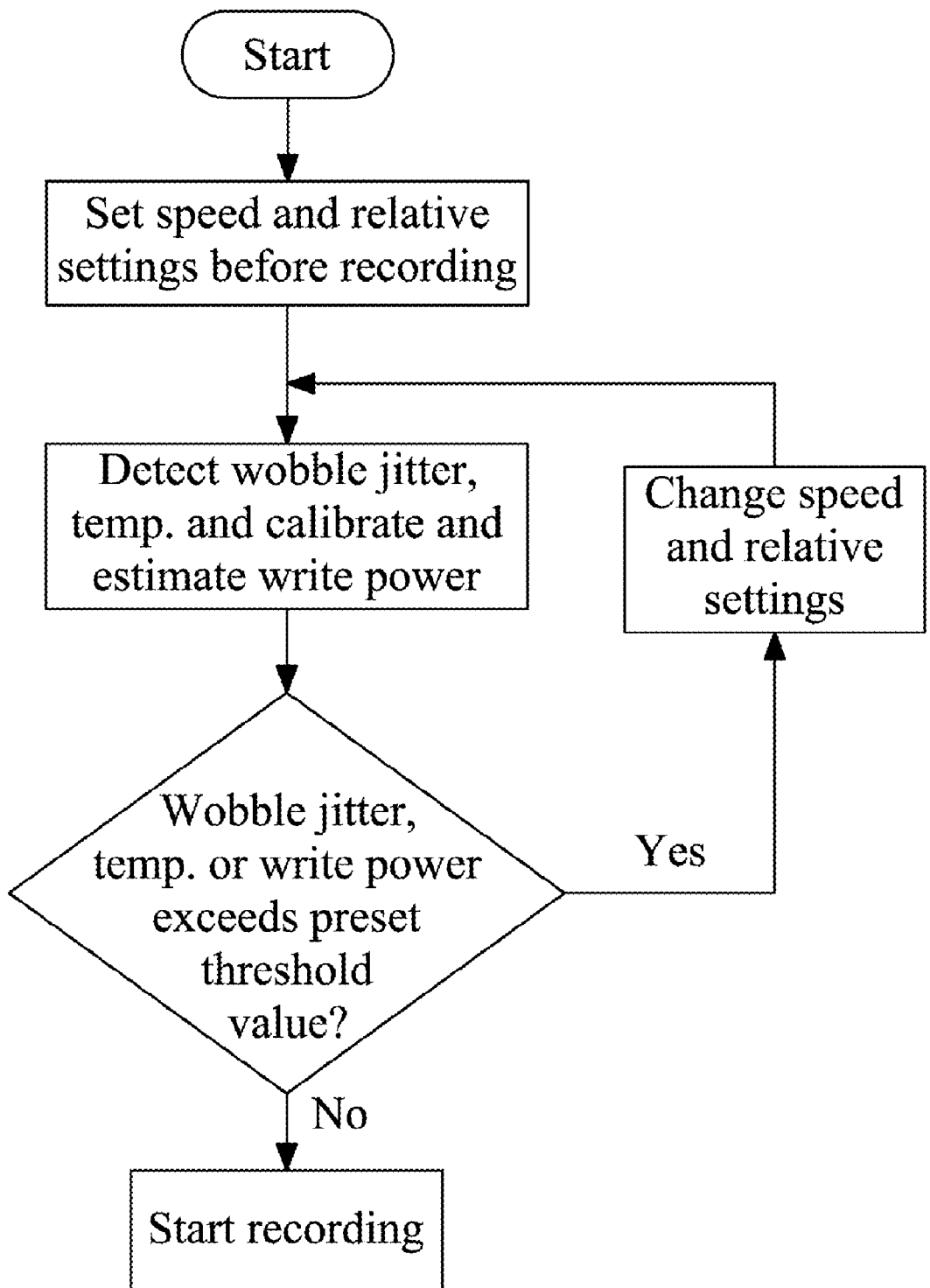
FIG. 5 illustrates a recording flow chart of an optical disk drive before recording of the third embodiment in accordance with the present invention.

FIG. 5 illustrates the control process of the driver speed before recording. The driver speed and the relative settings are set, and then the wobble jitter and the temperature of the drive are detected and the write power is calibrated and estimated. If at least one of the wobble jitter, the temperature of the drive and write power exceeds the corresponding preset value, the driver speed is lowered and the relevant settings are changed. Otherwise, it is deemed as a safe situation and the recording is started.

Figure 6:
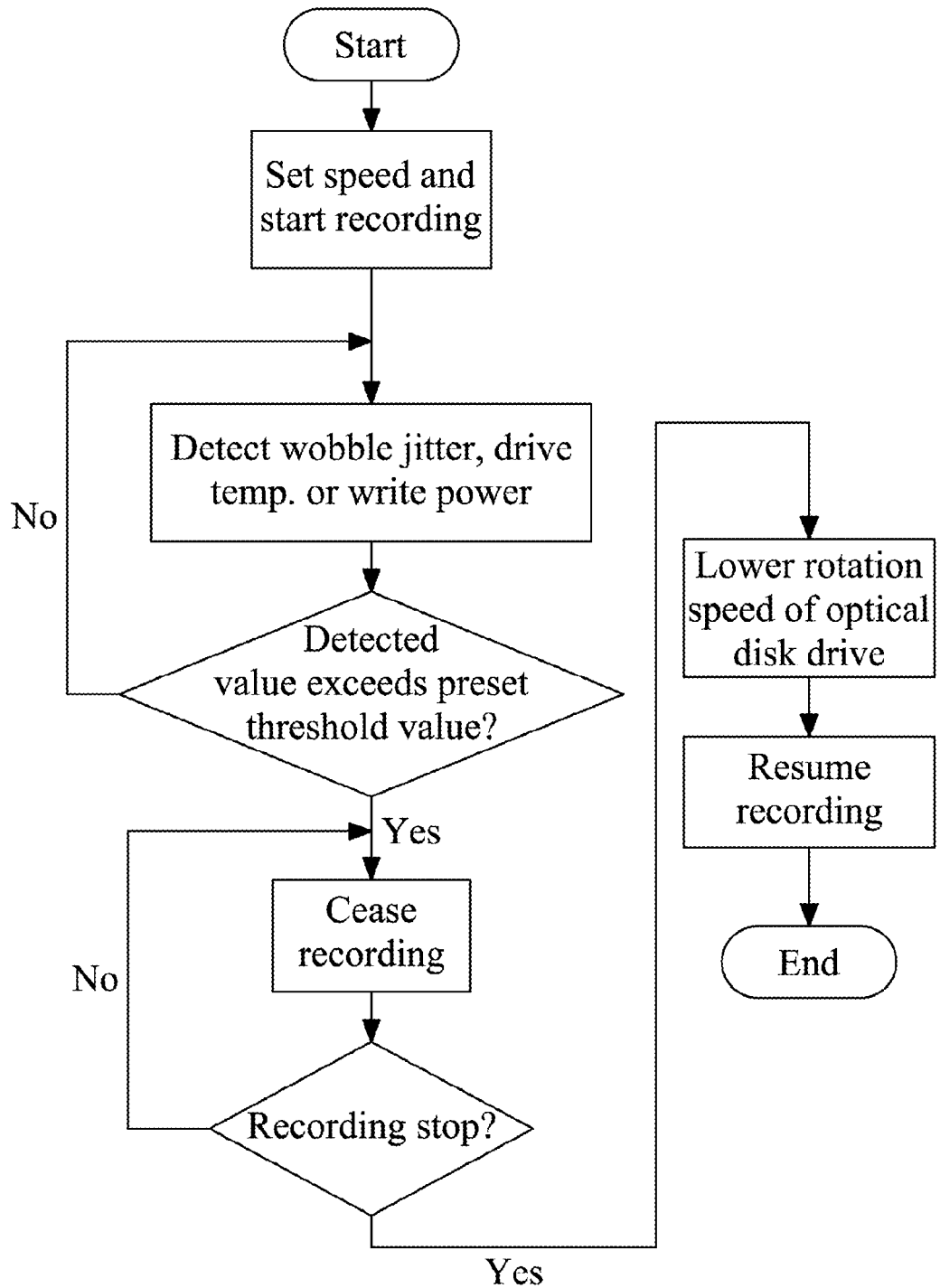
FIG. 6 illustrates a recording flow chart of an optical disk drive during recording of the fourth embodiment in accordance with the present invention.

FIG. 6 illustrates the control process of the driver speed during recording, i.e., after the recording is started. Similarly, the driver speed and the relative settings are set and followed by detecting the temperature of the drive, the wobble jitter or the write power. If the temperature of the drive, the wobble jitter or the write power exceeds the preset threshold value, the recording is paused, and the rotation speed of the driver is decreased afterwards. The recording is not resumed until the rotation speed of the optical disk drive is decreased.

With the advancement of technology, recording speed has increased. However, high recording speeds may induce noises in servo signals, wherein the noises may be caused by disc quality characteristics (e.g. uneven dyes for a disc) or optical disk drive mechanism characteristics (e.g. vibration).

Figure 7:
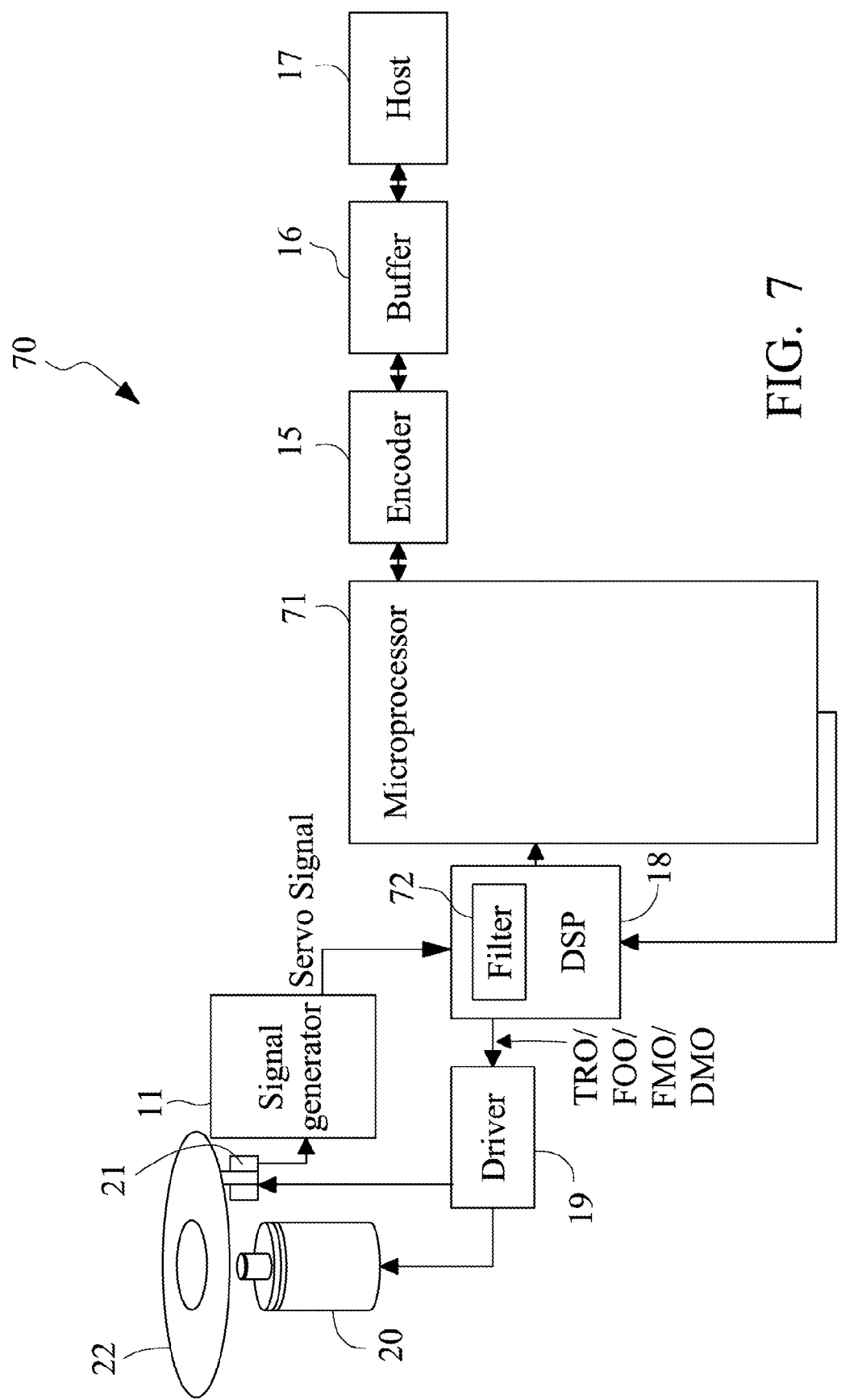
FIG. 7 shows a schematic diagram illustrating a recording apparatus for an optical disk drive according to an embodiment of the invention.

FIG. 7 shows a schematic diagram illustrating a recording apparatus 70 for an optical disk drive according to an embodiment of the invention. The recording apparatus 70 comprises a signal generator 11, a microprocessor 71, an encoder 15, a buffer 16, a host 17, a DSP 18 and a driver 19. The signal generator 11 coupled to an optical pickup head 21 is used to synthesize the optical signals read from an optical disk 22 by the optical pickup head 21 and generate the servo signals, such as the tracking error (TE) signals required for track locking, the focusing error (FE) signals required for focusing, the wobble signals required for positioning or controlling the recording speed, and the sub-beam add (SBAD) signal representing total intensity of reflected lights, and so on. The servo signals are then sent to the DSP 18 so as to generate the driving signals TRO, FOO, FMO and DMO to the driver 19. In addition, the DSP 18 filters the servo signals with a filter 72 to filter out the noises. In some embodiments, the filter 72 can be implemented by hardware instead of the DSP 18. The driver 19 drives the optical pickup head 21 according to the driving signals TRO, FOO and FMO, and drives the motor 20 to rotate the optical disk 22 according to the driving signal DMO. Thus, the recording speed of the optical disk drive is controlled by the driver 19. The microprocessor 71 receives and detects the filtered servo signals to determine whether to decrease the recording speed for recording. The microprocessor 71 may detect whether a signal level of the filtered servo signal exceeds a specific threshold. The microprocessor 71 may include a counter to generate a count value according to the filtered servo signal. The counter may generate the count value by counting the number of times that a signal level of the filtered servo signal exceeds a specific threshold. The counter may be implemented in a circuit external to the microprocessor 71 or an internal operation of the microprocessor 71. In addition, the circuit external to the microprocessor 71 may also be used to detect whether the signal level of the filtered servo signal exceeds the specific threshold, so as to reduce burden for the microprocessor 71. A count value of the counter may be updated by the microprocessor 71 once the signal level of the filtered servo signal is larger than the specific threshold. When the count value of the counter exceeds a trigger value, the microprocessor 71 sends a recording pause command to the encoder 15 and notifies the host 17 to stop transferring data to the buffer 16. When termination of the recording is confirmed, the microprocessor 71 sets relative parameters for decreasing the recording speed of the optical disk drive, and transmits the set parameters to the DSP 18 to generate the driving signal DMO so as to decrease the recording speed of the motor 20. Next, the microprocessor 71 sends a recording connection command to the encoder 15 to implement sequential recording and continuously monitors that whether the servo signals meet the recording termination criteria. Further, the microprocessor 71 may reset the counter to re-count the number of times that the signal level of the filtered servo signal exceeds the specific threshold. In some embodiments, the microprocessor 71 may reset the counter to re-generate the count value when the recording speed of the optical disk drive is decreased.

In FIG. 7, the filter 72 is implemented by the DSP 18, which is a filter with a specific bandwidth, wherein the specific bandwidth could be determined according to the current recording speed of the optical disk drive. Therefore, when the microprocessor 71 notifies the DSP 18 to generate the driving signal DMO to decrease the recording speed of the motor 20, the DSP 18 may adjust the specific bandwidth of the filter 72 in response to the decreased recording speed of the motor 20. In the embodiment, the filter 72 is a band pass filter with a bandwidth range between four times (4×) the recording speed and forty times (40×) the recording speed. For example, when the recording speed of a spindle in the motor 20 is 250 Hz, the DSP 18 may adjust the coefficients of the filter 72 so as to obtain a bandwidth range between 1 KHz and 10 KHz for the filter 72. In the invention, the bandwidth range between four times (4×) the recording speed and forty times (40×) the recording speed is designed to filter out the low frequency noise caused by the recording speed, such as harmonics, and the high frequency noise caused by the disc quality or optical disk drive mechanism characteristics. In one embodiment, the filter 72 is implemented in a circuit external to the DSP 18. In another embodiment, the filter 72 and the counter which is used to count the number of times that the signal level of the filtered servo signal exceeds the specific threshold may be implemented in the same circuit.

Figure 8:
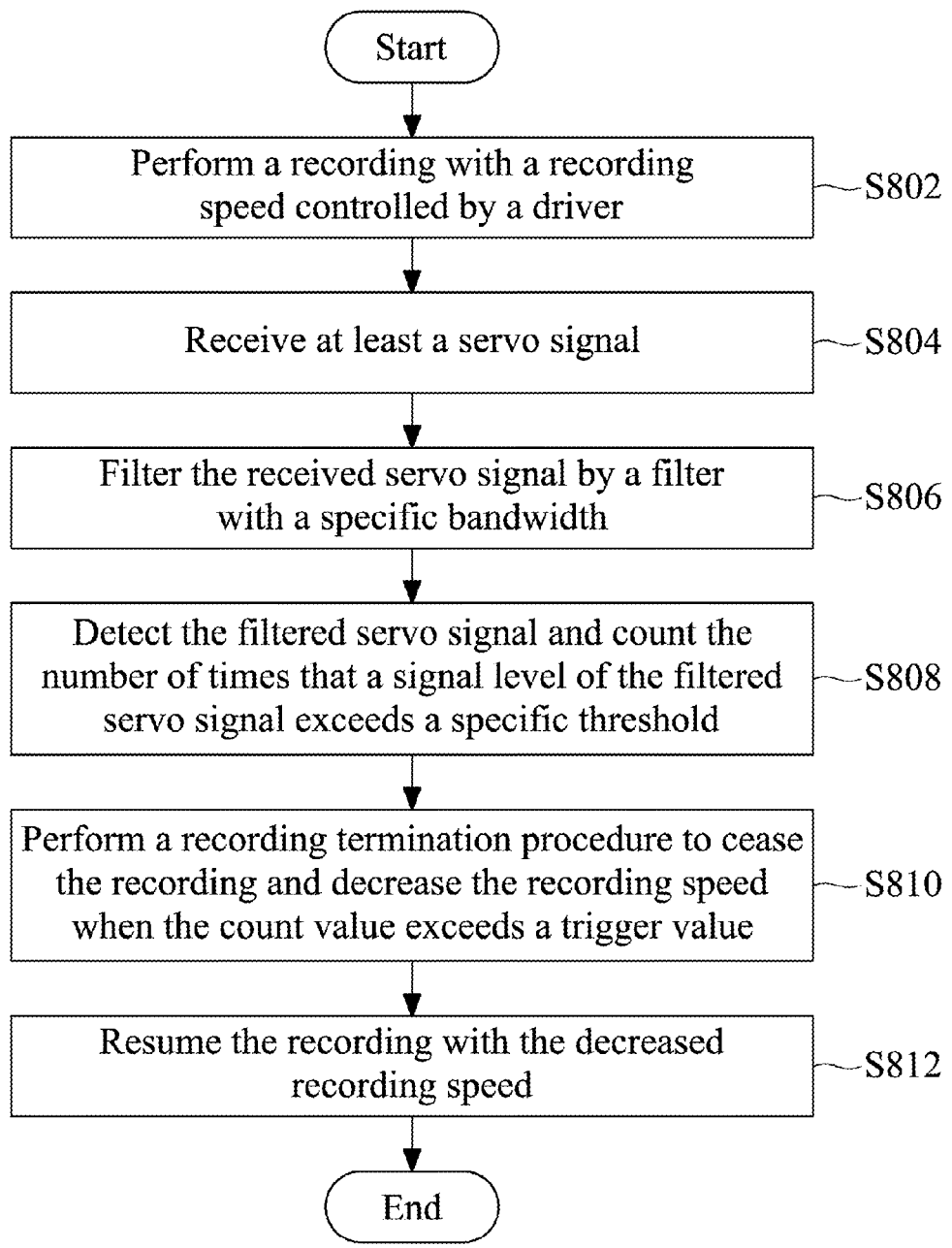
FIG. 8 shows a recording method for an optical disk drive according to an embodiment of the invention.

FIG. 8 shows a recording method for an optical disk drive according to an embodiment of the invention. First, in an optical disk drive, a recording procedure is performed with a recording speed controlled by a driver (step S802), and a servo signal generator generates the servo signals by synthesizing the optical signals read from an optical disk. Next, a filter receives at least a servo signal (step S804) and then filters the received servo signal with a specific bandwidth (step S806). Next, it is detected whether a signal level of the filtered servo signal exceeds a specific threshold, and a count value of a counter is updated when it is determined that the signal level of the filtered servo signal exceeds the specific threshold (step S808). When the count value of the counter exceeds a trigger value, a recording termination procedure is performed to cease the recording procedure and notifies the driver to decrease the recording speed (step S810). Next, the recording procedure is resumed with the decreased recording speed (step S812) and the specific bandwidth of the filter is adjusted in response to the decreased recording speed so as to filter the servo signal received according to the decreased recording speed. By using a filter with a bandwidth range between four times (4×) the recording speed and forty times (40×) the recording speed to filter out the noise of the servo signals, the recording quality is improved.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A recording apparatus for an optical disk drive, comprising:
    a driver, controlling a recording speed of the optical disk drive;
    a servo signal generator, generating at least a servo signal;
    a band pass filter with a specific bandwidth, filtering out noises from the servo signal to generate a filtered servo signal; and
    a counter, generating a count value according to the filtered servo signal and instructing the driver to decrease the recording speed of the optical disk drive when the count value exceeds a trigger value, so as to record with the decreased recording speed,
    wherein the specific bandwidth comprises a range between four times and forty times the recording speed.

2. The recording apparatus as claimed in claim 1, wherein the specific bandwidth of the band pass filter is determined according to the recording speed of the optical disk drive.

3. The recording apparatus as claimed in claim 1, wherein the specific bandwidth of the band pass filter is adjusted in response to the decreased recording speed.

4. The recording apparatus as claimed in claim 1, wherein the band pass filter is implemented by a digital signal processor (DSP).

5. The recording apparatus as claimed in claim 1, further comprising:
    a microprocessor detecting whether a signal level of the filtered servo signal exceeds a specific threshold and updating the count value of the counter when the signal level of the filtered servo signal exceeds the specific threshold.

6. The recording apparatus as claimed in claim 5, wherein the microprocessor resets the counter to re-generate the count value when the recording speed of the optical disk drive is decreased.

7. The recording apparatus as claimed in claim 1, wherein the servo signal comprises at least one of a focusing error signal, a tracking error signal, a wobble signal and a sub-beam add signal.

8. The recording apparatus as claimed in claim 1, wherein the band pass filter and the counter are implemented in the same circuit.

9. A recording method for an optical disk drive, comprising:
- performing a recording with a recording speed of the optical disk drive controlled by a driver of the optical disk drive;
- receiving at least a servo signal from a servo signal generator;
- filtering out noises from the received servo signal by a band pass filter with a specific bandwidth;
- generating a count value according to the filtered servo signal by a counter of the optical disk drive;
- ceasing recording and decreasing the recording speed of the optical disk drive when the count value exceeds a trigger value; and
- resuming recording with the decreased recording speed,
- wherein the specific bandwidth comprises a range between four times and forty times the recording speed.

10. The recording method as claimed in claim 9, wherein the specific bandwidth of the band pass filter is determined according to the recording speed of the optical disk drive.

11. The recording method as claimed in claim 9, further comprising:
- adjusting the specific bandwidth of the band pass filter according to the decreased recording speed.

12. The recording method as claimed in claim 9, wherein the step of generating the count value further comprises:
- detecting whether a signal level of the filtered servo signal exceeds a specific threshold; and
- updating the count value when it is determined that the signal level of the filtered servo signal exceeds the specific threshold.

13. The recording method as claimed in claim 9, wherein a microprocessor of the optical disk drive is used to detect whether a signal level of the filtered servo signal exceeds a specific threshold and update the count value of the counter when the signal level of the filtered servo signal exceeds the specific threshold.

14. The recording method as claimed in claim 9, wherein the band pass filter is implemented by a digital signal processor (DSP) of the optical disk drive.

15. The recording method as claimed in claim 9, further comprising:
- resetting the counter to re-generate the count value when the recording speed of the optical disk drive is decreased.

16. The recording method as claimed in claim 9, wherein the servo signal comprises at least one of a focusing error signal, a tracking error signal, a wobble signal and a sub-beam add signal.

17. The recording method as claimed in claim 9, wherein the band pass filter and the counter are implemented in the same circuit within the optical disk drive.

18. The recording method of as claimed in claim 17, further comprising:
- adjusting the specific bandwidth of the band pass filter according to the decreased recording speed; and
- wherein the step of generating the count value further comprises:
- detecting whether a signal level of the filtered servo signal exceeds a specific threshold; and
- updating the count value when it is determined that the signal level of the filtered servo signal exceeds the specific threshold.

* * * * *